United States Patent [19]

Baka

[11] Patent Number: 5,558,145
[45] Date of Patent: Sep. 24, 1996

[54] PORTABLE AWNING ASSEMBLY

[75] Inventor: Gregory J. Baka, Kendallville, Ind.

[73] Assignee: The Dometic Corporation, LaGrange, Ind.

[21] Appl. No.: 255,187

[22] Filed: Jun. 7, 1994

[51] Int. Cl.$^6$ .................................................... E04F 10/06
[52] U.S. Cl. ........................................ 160/67; 135/88.12
[58] Field of Search ................................ 160/66, 67, 46, 160/71, 80; 248/206.1, 206.2, 206.3, 206.4; 135/88.12

[56] References Cited

U.S. PATENT DOCUMENTS

| | | |
|---|---|---|
| 1,618,065 | 2/1927 | Davis . |
| 2,594,386 | 4/1952 | Blessen .......................... 160/370.22 X |
| 2,713,689 | 7/1955 | Godwin, Sr. . |
| 2,718,015 | 9/1955 | Fisk . |
| 2,825,351 | 3/1958 | Thornton . |
| 2,853,129 | 9/1958 | Leavitt et al. . |
| 2,859,756 | 11/1958 | Barnes . |
| 2,897,002 | 7/1959 | Yovich . |
| 2,938,525 | 5/1960 | MacKinlay . |
| 2,972,377 | 2/1961 | Jacobs . |
| 3,018,782 | 1/1962 | Hershberger . |
| 3,018,783 | 1/1962 | Tyson . |
| 3,040,756 | 6/1962 | Zerbe . |
| 3,047,058 | 7/1962 | Cormier . |
| 3,068,046 | 12/1962 | Bourgoin . |
| 3,156,497 | 11/1964 | Lessard . |
| 3,255,768 | 6/1966 | Lowe . |
| 3,289,684 | 12/1966 | Lowe . |
| 3,446,220 | 5/1969 | Schafer . |
| 3,702,617 | 11/1972 | Franzen . |
| 3,720,438 | 3/1973 | Johnson et al. . |
| 3,870,061 | 3/1975 | Lowery . |
| 3,957,301 | 5/1976 | Huber . |
| 4,020,888 | 5/1977 | Upton et al. . |
| 4,058,133 | 11/1977 | Barr et al. . |
| 4,164,972 | 8/1979 | Bennett ............................ 135/88.12 X |
| 4,175,576 | 11/1979 | Iby . |
| 4,222,400 | 9/1980 | Reimer . |
| 4,508,126 | 4/1985 | Everard ................................. 160/67 X |
| 4,655,236 | 4/1987 | Dorame et al. . |
| 4,684,165 | 8/1987 | Becker . |
| 5,197,503 | 3/1993 | Chen . |

FOREIGN PATENT DOCUMENTS

| | | |
|---|---|---|
| 0084477 | 7/1983 | European Pat. Off. . |
| 8530528 | 2/1986 | Germany . |
| 2022184 | 12/1979 | United Kingdom . |

OTHER PUBLICATIONS

Trim Line A&E Trim Line Awning Models Installation & Operating Instructions by: The Dometic Corporation Jul. 23, 1993.

*Primary Examiner*—Blair Johnson
*Attorney, Agent, or Firm*—Pearne, Gordon, McCoy & Granger

[57] ABSTRACT

A header bar is secured to the roof of a van by adjustable suction cups. The awning has one edge fastened to the header bar and an opposite edge fastened to a roller tube. The roller tube is supported by a pair of adjustable support poles. The awning is held in tension by spring loaded rafters located between the header bar and the roller tube. The suction cups are slidable in a pair of parallel channels of the header bar. The suction cups are also vertically adjustable. The parts can be disassembled and stored in a storage bag or tube.

22 Claims, 4 Drawing Sheets

PORTABLE AWNING ASSEMBLY

BACKGROUND OF THE INVENTION

1. Field of the Invention

This invention relates generally to the field of awnings and specifically to a portable awning assembly for a vehicle.

2. Description of the Related Art

Awnings have long been used to form shelters adjacent buildings and vehicles. Commonly, one edge of the awning is attached to the building or vehicle and an opposing edge is supported by poles, outriggers, or the like. The awning is frequently rollable on a bar or tube. It is desirable to construct such an awning so that it is completely portable, that is, removable from the vehicle or building so that it can be stored or used on other vehicles or buildings. It is particularly desirable to have an awning assembly that can be installed on and removed from a vehicle without modifying or damaging the vehicle.

Awnings are known wherein an awning rail is permanently fastened to a vehicle. The awning is attachable to the rail. An assembly of spring loaded rafters and cam-locked adjustable support poles hold the awning in an extended, generally horizontal position.

U.S. Pat. Nos. 2,713,689, 2,825,351, 2,938,525, 2,972,377, 2,718,015, 2,897,002, 2,859,756, 2,853,129, 3,018,782, 3,040,756, 3,255,768, 3,289,684, 3,702,617, 3,870,061, 3,018,783, 3,446,220, 3,047,058, 3,156,497, 3,957,301, 3,068,046, 4,222,400, 4,058,133, 4,655,236, 4,684,165, and 5,197,503 show various awnings, shades, and tents attached to vehicles by suction cups. U.S. Pat. No. 4,175,576 shows a portable tent attached to the side of a van by straps. U.S. Pat. No. 1,618,065 shows a sun shade stored in a tube.

None of the prior art references shows an awning having the improved flexibility, portability, simplicity, and ease of installation according to the present invention.

SUMMARY OF THE INVENTION

The present invention provides a portable awning assembly. An awning has one of a leading edge and a trailing edge fastened to a roller so as to be rollable around the roller. The trailing edge is fastenable at a mounting surface. A pair of support poles is removably disposable between the leading edge of the awning and a ground surface so as to support the awning. A rafter is removably disposed between the leading and trailing edges of the awning so as to maintain the awning in an extended position.

A header rail removably mountable on the mounting surface has the awning fastened thereto. The rafter is disposable between the header rail and the leading edge. Suction cups are slidingly disposable on the header rail for attachment of the header rail to the mounting surface. One or a pair of substantially parallel slide channels is disposed on the header rail, a mount for each of said suction cups being receivable in one of said channels. The suction cups are vertically adjustable.

A length of said support poles is adjustable, and stakes secure the support poles to the ground surface. A second rafter can be added and said rafters are disposed along opposite edges of the awning. The rafter is biased toward an extended position. The rafters and poles are of a type that is known in the art.

One embodiment of the awning assembly includes a header rail removably mountable on a mounting surface; a roller; an awning having a leading edge fastened to the roller so as to be rollable around the roller and a trailing edge fastened to the header rail; a pair of support poles removably disposable between the roller and a ground surface so as to support the awning; and a pair of rafters removably disposable between the header rail and the roller so as to maintain the awning in an extended position.

The rafters are removably fastenable to the roller, and include rafter pins insertable in holes of the roller. The rafter pin is insertable so as to extend through an aperture disposed at an upper end of the support pole to secure the support pole between the roller and the rafter. The support arms are removably fastenable to the roller.

The header rail includes a back wall for engaging an end of the rafters and a base wall on which the awning rests in a retracted position. The mounting surface is a roof of a vehicle or a vertical sidewall.

The invention also includes a method of installing a portable awning assembly on a mounting surface, said awning assembly including an awning fastened to and rolled on a roller. The steps include:

installing a plurality of suction cups on a header rail;

placing the header rail near the surface and pressing the header rail toward the mounting surface so as to engage the suction cups with the mounting surface and mount the header rail thereon;

unrolling the awning from the roller;

installing a pair of rafters between the header rail and a leading edge of the awning so as to maintain the awning in an extended position; and installing a pair of support poles between the leading edge and a ground surface so as to support the awning above the ground surface.

BRIEF DESCRIPTION OF THE DRAWINGS

FIG. 2 shows a detailed view of an assembly of a rafter, header rail, and suction cup of the awning assembly;

FIG. 3 shows a detailed view of a suction cup assembly for the awning;

DESCRIPTION OF THE PREFERRED EMBODIMENTS

Figures 1, 4:
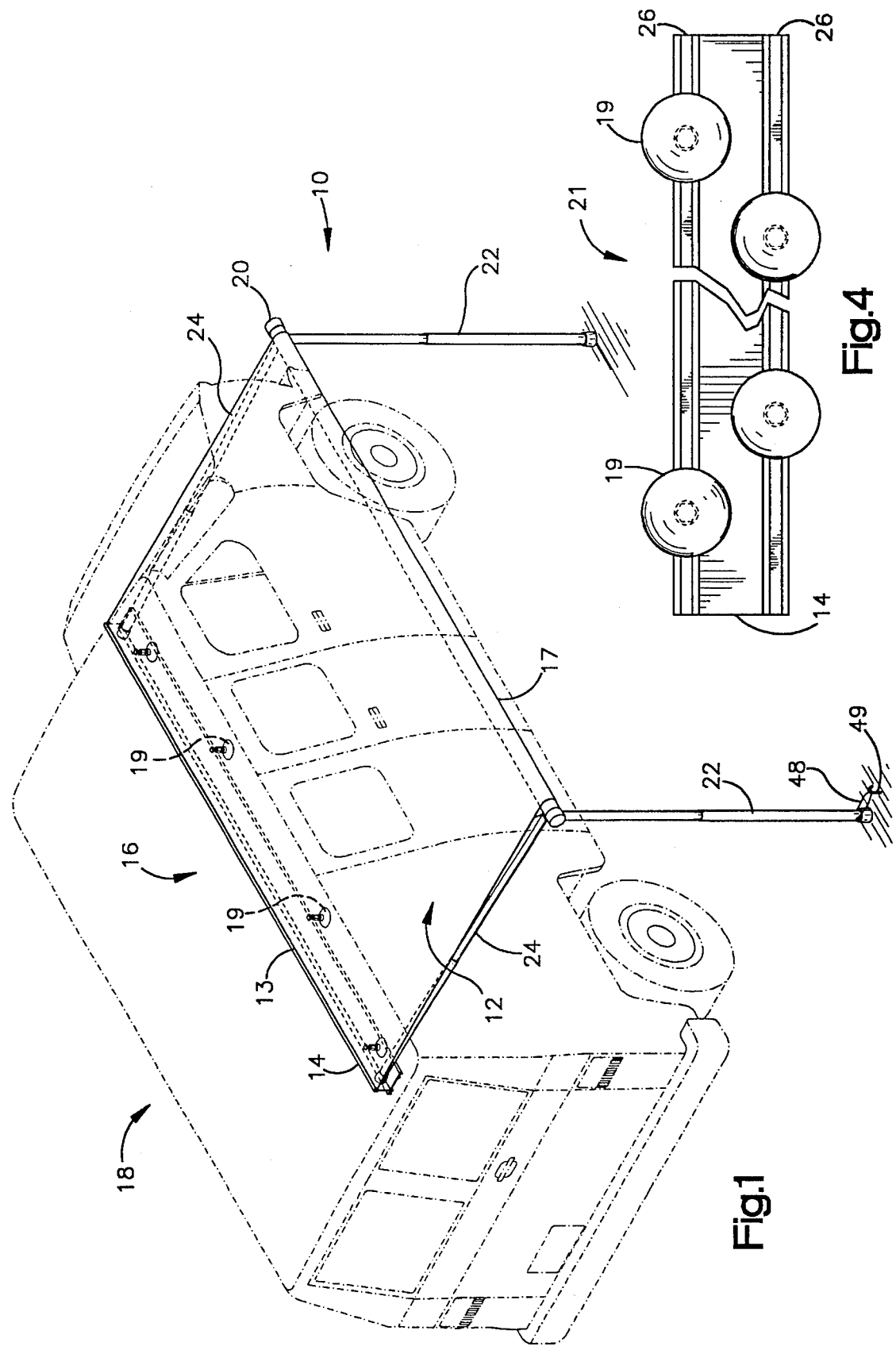
FIG. 1 shows a perspective view of an awning assembly mounted on a van according to the invention.
FIG. 4 shows a bottom view of the header rail and suction cups of the awning assembly.

Referring to FIG. 1, an awning assembly 10 includes an awning 12 comprising a sheet of fabric, vinyl or the like. The awning 12 is preferably opaque and water resistant so as to provide a shelter from sun and rain. A trailing edge 13 of the awning 12 is secured to a header rail 14. The header rail 14 is mounted on a generally flat surface, such as a wall or roof 16 of a vehicle 18 or other structure, by means of a plurality of suction cups 19. A leading edge 17 of the awning 12, opposite the trailing edge 17, is secured to a generally cylindrical roller tube 20 or other roller so as to be rollable thereon. The roller may be a hollow tube or solid bar of a suitable shape, size, and weight for rolling the awning 12 and minimizing sagging of the awning in an extended position. The roller and header rail are preferably made from a durable lightweight material, such as aluminum, to facilitate manual mounting, unrolling, and assembly of the awning assembly. The leading edge 17 is supported above ground 21 or another generally horizontal surface by a pair of support poles 22. Rafters 24 are disposed between the header rail 14 at the trailing edge 13 and the leading edge 17 to maintain the awning 12 in tension.

As shown in FIG. 2, the header rail 14 includes a generally horizontal base wall 25 having a pair of downwardly opening, longitudinal slide channels 26. A back wall 28 extends vertically from the base wall 25. The awning 12 is secured to the header rail 14 by suitable means, such as a "C" channel 30 diposed along an upper edge of the back wall 28. Preferably, a rod 32 is inserted in a sewn seam of the trailing edge 13 of the awning 12 to secure the awning in the "C" channel 30. The header rail 14 extends slightly beyond the full width of the awning 12.

The slide channels 26 are adapted to receive therein a suitable number of suction cup assemblies 34, also shown in FIG. 3. Each suction cup assembly 34 includes the suction cup 19 having an upwardly extending male thread 36. A mounting bolt 38 having a square head 40 is receivable in one of the slide channels 26 and is slidable therein. The suction cup 19 and bolt 38 are threaded into a spacer 42 having female threads. The spacing of the suction cup 19 and header rail 14 can be adjusted by relative rotation of the suction cup 19 and bolt 38. Alternatively, the spacer 42 can have reversed threading at each end and the bolt 38 and suction cup 19 can have opposing threads to permit adjustment by rotation of the spacer 42. A tab 43 is provided for releasing the suction cup.

FIG. 4 shows a preferred installation of suction cups 19 in the header rail 14, wherein two suction cups 19 are installed in each slide channel 26. The slide channels 26 are laterally spaced so as to resist lateral tilting of the header rail 14 resulting from forces applied to the awning 12, such as wind. The suction cups 19 are longitudinally spaced so as to evenly distribute forces applied to the header rail 14 and to allow the suction cups to spread when installed on the mounting surface 16. The suction cups 19 can be positioned in the slide channels 26 to provide clearance for obstacles such as roof racks or wall fixtures. The size and number of suction cups required depend on the size of the awning and the surface on which the header rail is mounted. For the awning installed on a van, as shown in FIG. 1, four ALL-VAC Ind., Part No. 400-MS suction cups having a diameter of about 9.5 cm are suitable.

Figure 5:
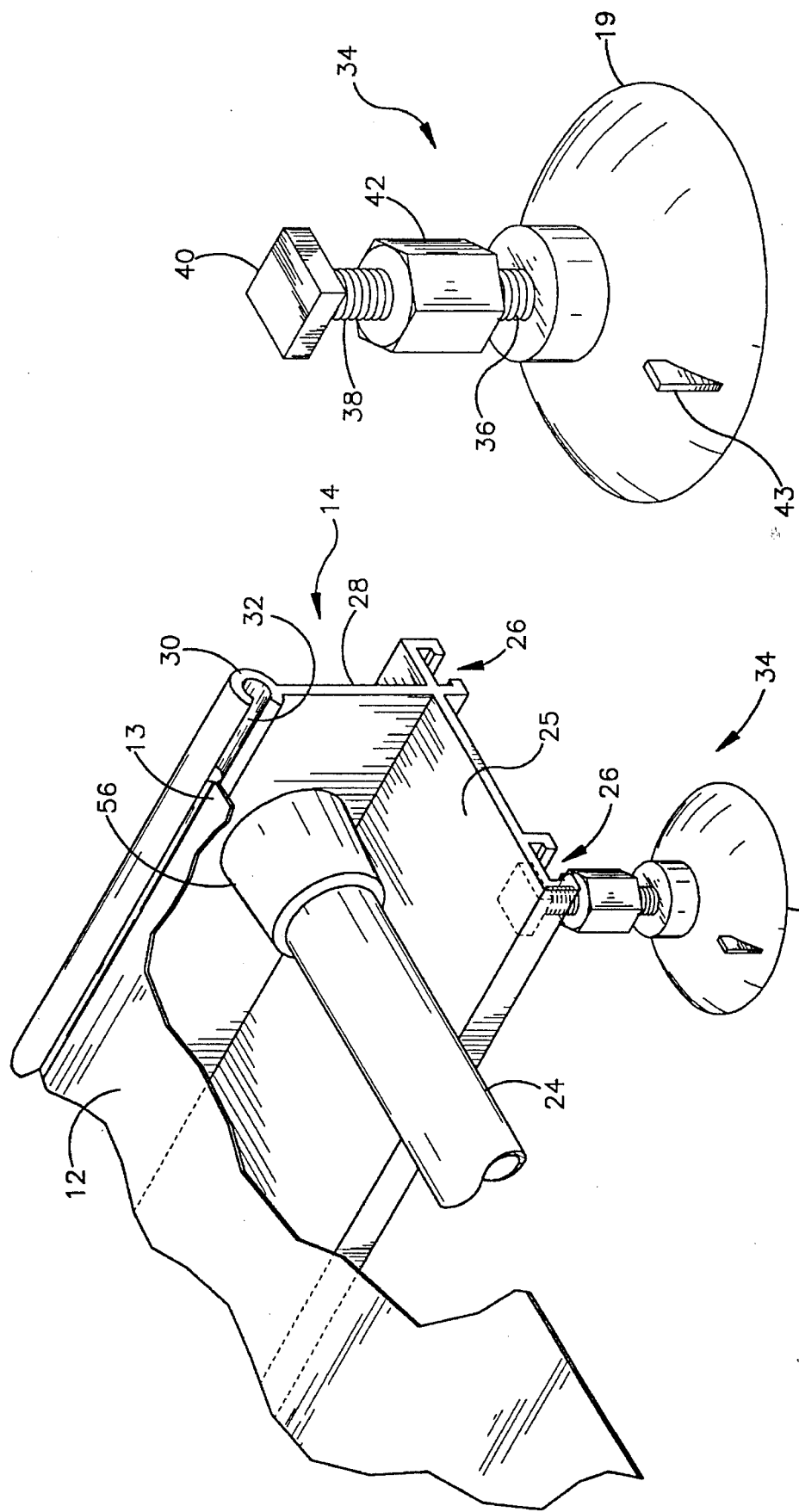
FIG. 5 shows a detailed view of an assembly of a roller tube, support pole, and rafter of the awning assembly.

Referring to FIGS. 1 and 5, each rafter 24 preferably includes two telescoping tubular pieces biased toward an extended position by an internal spring 23 (FIG. 7), for example. One end of the rafter 24 is provided with a rafter pin 44 projecting therefrom. Each support pole 22 is also a telescoping two-piece tubular construction. The support poles 22 are adapted to be adjusted to and locked at a desired length by means of a suitable locking device, such as an internal cam (not shown) that can be locked by relative twisting of upper and lower parts of the pole. A lower end of the support pole is provided with a foot 46, such as a rubber cap or spike for engaging a ground surface. A tie-down loop 48 or cord is provided for receiving a stake 49 or other fastener. An upper end of the support pole is provided with an aperture 50 therethrough and adapted for receiving the rafter pin 44. A hole 52 is provided near each end of the roller tube 20 for receiving the rafter pins 44. Ends of the roller tube are provided with plastic caps 54.

Referring to FIG. 2, an end of the rafter 24 opposite the rafter pin 44 is provided with a cap 56 or foot, preferably of rubber, for engaging the header rail 14.

Figure 6:
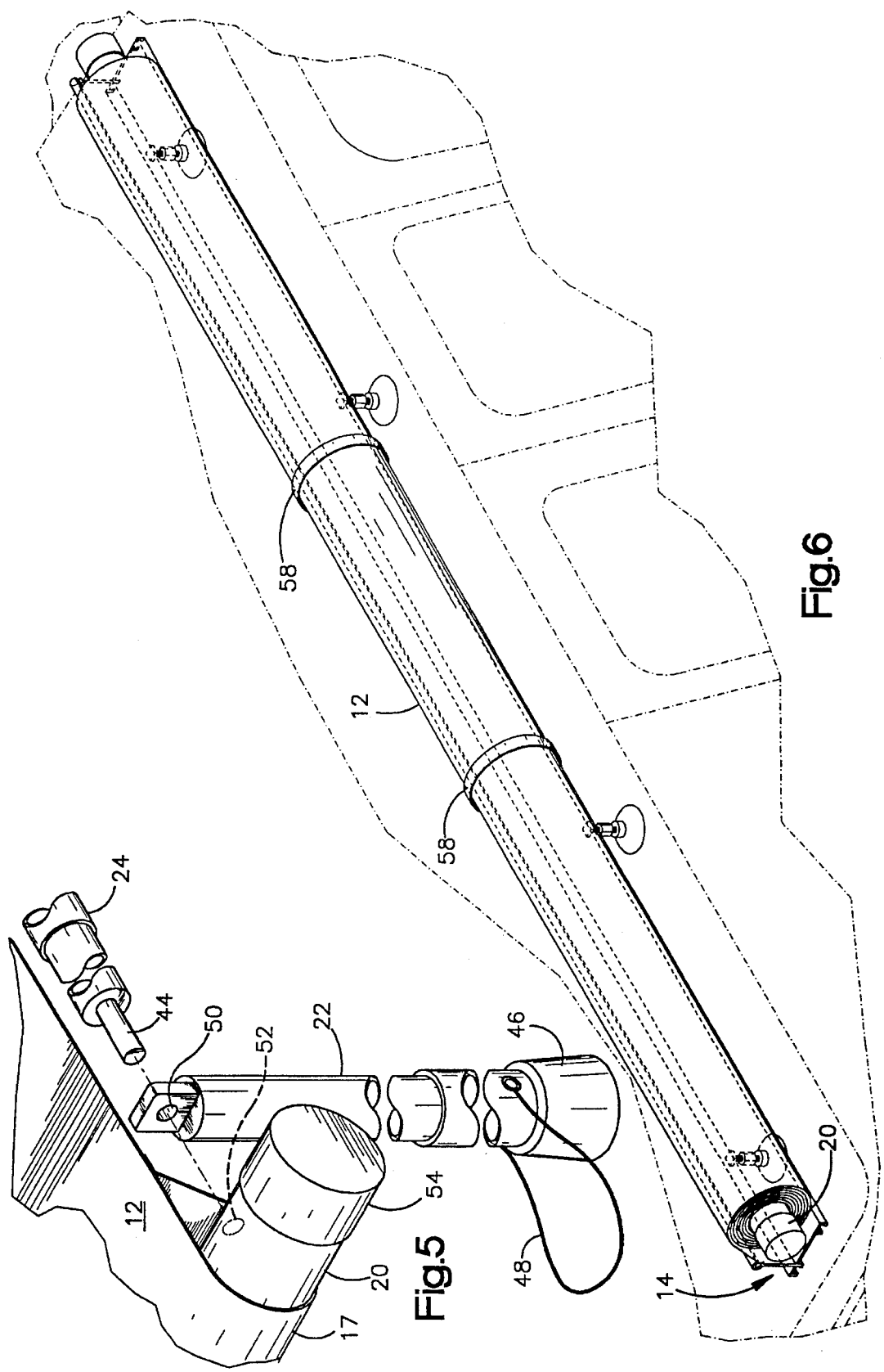
FIG. 6 shows a perspective view of the awning in a retracted position.

For installation, the suction cups 19 are installed in the slide channels 26 and slid into desired positions, as shown in FIGS. 2 and 4. The header rail 14 is placed on the mounting surface 16, in this case a van, as shown in FIG. 6. Straps 58 are provided to retain the awning 12 in a retracted position, that is, rolled around the roller tube 20, so as to rest on the header rail 14. The height of the suction cups 19 can be adjusted by rotation thereof, as necessary. The header rail 14 is pressed downwardly to seal the suction cups 19 to the surface 16. The awning 12 is released by removing the straps 58 and the awning is unrolled from the roller tube 20.

As shown in FIG. 5, the rafter pin 44 of each rafter 24 is inserted through the aperture 50 of the support pole 22 into the hole 52 in the roller tube 20. Each rafter 24 is then compressed and inserted against the back wall 28 of the header rail 14, as shown in FIG. 2. The spring bias of the rafter 24 holds it firmly in place against the back wall 28 and holds the awning 12 in tension. A removable fastener (not shown), such as a hook and loop type, can be used to secure edges of the awning 12 to the rafters 24.

Referring to FIG. 1, the support poles 22 are placed in a generally vertical position so as to support the awning 12. The stakes 49 are driven through the tie-down loops 48 to secure the support poles 22 in place. The angle of the awning 12 can be adjusted by twisting the lower part of the support pole 22 to unlock the pole. The upper part of the support pole 22 is then freely slidable to a desired length at which the lower part is then twisted to lock the awning 12 in place.

Figure 7:
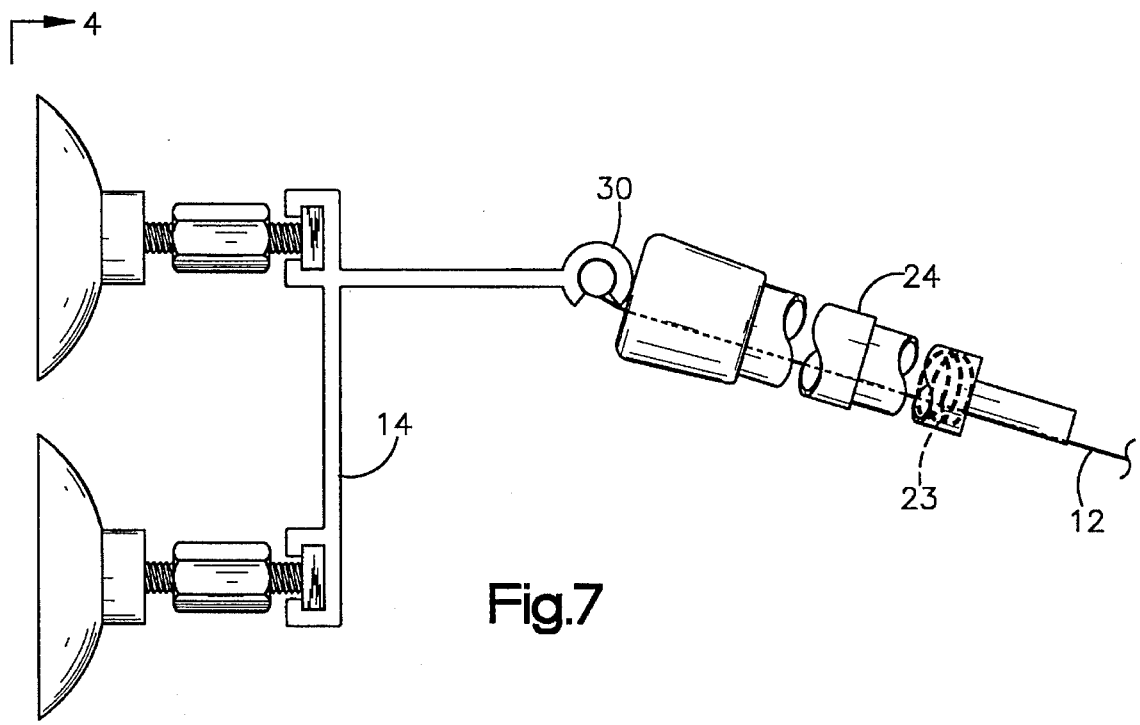
FIG. 7 shows an elevational end view of the header rail in an alternative installation.

FIG. 7 shows an alternative installation on a vertical surface. The installation steps are as described above, except that the rafters 24 are engaged against the "C" channel 30 to maintain tension in the awning 12. The surface on which the header rail is mounted, whether vertical, horizontal, or sloped, should be relatively smooth and clean to ensure adherence of the suction cups. For some rough surfaces, for example, a brick wall, a mounting surface, such as a board, may be mounted to the rough surface to facilitate adherence of the suction cups.

Figure 8:
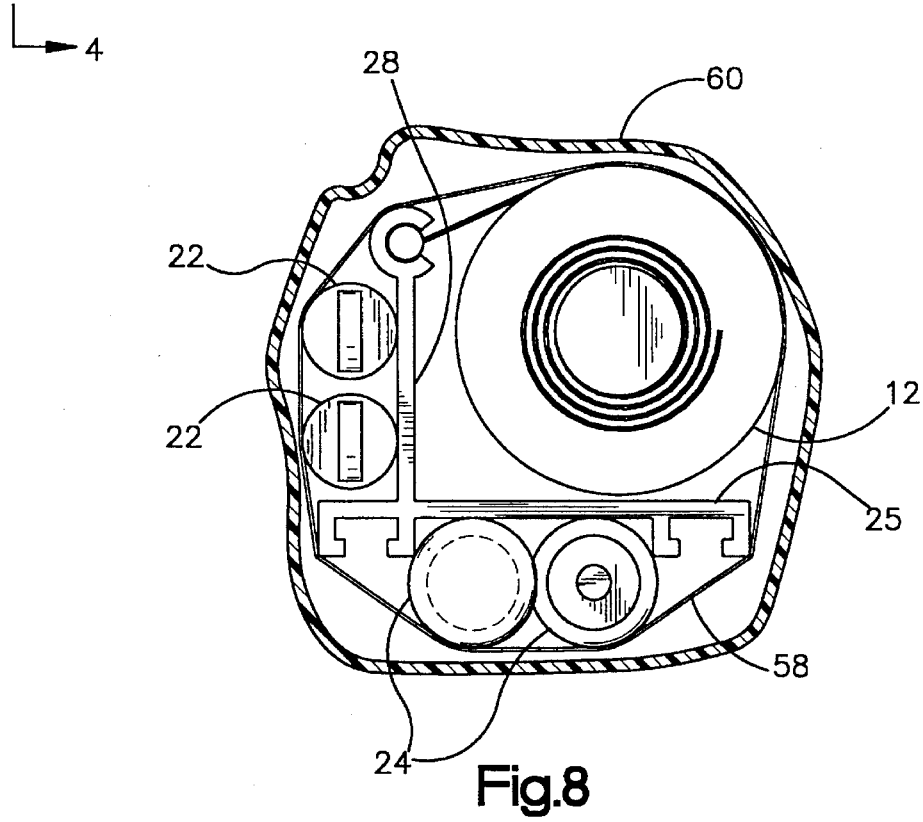
FIG. 8 shows an end view of the awning components stored in a storage bag.

To disassemble the awning 12, the steps described above are reversed. For storage, the support poles are placed along the back wall 28 and the rafters 24 are placed along the base wall 25, as shown in FIG. 8. The straps 58 are wrapped around the assembly of parts, which parts are then placed inside a storage bag 60 or tube. The suction cup assemblies 34 and stakes 49 (not shown in FIG. 8) are inserted at an end of the storage bag 60. A drawstring (not shown) is provided on the bag 60 for closing. A cover (not shown) can be provided if a tube is used to enclose the parts.

According to an alternative assembly (not shown), the roller tube is rotatably mounted to the header rail. The trailing edge of the awning is secured to the roller tube at the mounting surface. A crank or spring device may be provided to assist rolling of the awning on the roller tube. A lead bar or rail is secured to the leading edge of the awning. The pins of the rafters are inserted into holes in the lead bar to secure the rafters between the lead and trailing edges of the awning. Otherwise the assembly is substantially as shown in the FIGS. and described above. This alternative assembly is analogous to stationary roll type awning of standard installations, whereas the embodiment shown is analogous to shifting roll type.

The invention provides a portable awning adapted for simple installation and removal. No permanent fixtures are required. All of the necessary parts can be contained and transported in a tube or bag.

The present disclosure describes several embodiments of the invention, however, the invention is not limited to these embodiments. Other variations are contemplated to be within the spirit and scope of the invention and appended claims.

What is claimed is:

1. A portable awning assembly, comprising:

a roller;

a header rail removably mounted on a mounting surface and having at least one slide channel;

an awning having one of a leading edge and a trailing edge fastened to the roller so as to be rollable around the roller, and said trailing edge being fastened at the header rail;

suction cups slidingly disposed in said slide channel of the header rail for attachment of the header rail to the mounting surface;

a pair of support poles removably disposable between the leading edge of the awning and a ground surface so as to support the awning; and a rafter removably disposable between the leading and trailing edges of the awning so as to maintain the awning in an extended position.

2. An awning assembly according to claim 1, wherein the rafter is disposable between the header rail and the leading edge.

3. An awning assembly according to claim 1, wherein a pair of said slide channels are substantially parallel and disposed on the header rail, a mount for each of said suction cups being receivable in one of said channels.

4. An awning assembly according to claim 1, wherein a length of said support poles is adjustable.

5. An awning assembly according to claim 1, further comprising a second rafter, wherein said rafters are disposed along opposite edges of the awning.

6. An awning assembly according to claim 1, wherein the rafter is extendable and includes means for biasing said rafter toward an extended position corresponding with the extended position of the awning.

7. A portable awning assembly, comprising:

a roller;

a header rail removably mountable on a mounting surface and having at least one slide channel;

an awning having one of a leading edge fastened to the roller so as to be rollable around the roller and a trailing edge fastened to the header rail;

suction cups slidingly disposed in said slide channel of the header rail for attachment of the header rail to the mounting surface;

a pair of support poles removably disposable between the roller and a ground surface so as to support the awning; and a pair of rafters removably disposable between the header rail and the roller so as to maintain the awning in an extended position.

8. An awning assembly according to claim 7, wherein the rafters are removably fastenable to the roller.

9. An awning assembly according to claim 8, wherein the rafters include rafter pins insertable in holes of the roller.

10. An awning assembly according to claim 9, wherein the rafter pin is insertable so as to extend through an aperture disposed at an upper end of the support pole to secure the support pole between the roller and the rafter.

11. An awning assembly according to claim 7, wherein the support arms are removably fastenable to the roller.

12. An awning assembly according to claim 7, further comprising mounts for said suction cups being receivable in the channel.

13. An awning assembly according to claim 7, wherein a pair of said slide channels are substantially parallel and disposed on the header rail, a mount for each of said suction cups being receivable in one of said channels.

14. An awning assembly according to claim 7, wherein the suction cups are vertically adjustable.

15. An awning assembly according to claim 7, wherein a length of said support poles is adjustable.

16. An awning assembly according to claim 7, further comprising stakes for securing the support poles to the ground surface.

17. An awning assembly according to claim 7, wherein the rafter is extendable and includes means for biasing said rafter toward an extended position corresponding with the extended position of the awning.

18. An awning assembly according to claim 7, wherein the header rail includes a rigid back wall for engaging an end of the rafters.

19. An awning assembly according to claim 7, wherein the header rail includes a base wall on which the awning rests in a retracted position.

20. An awning assembly according to claim 7, further comprising a roof of a vehicle defining the mounting surface.

21. A portable awning assembly, comprising:

a header rail having a pair of slide channels, a back wall, and a base wall;

a plurality of vertically adjustable suction cups slidingly receivable in one of the slide channels for removably mounting the header rail to a mounting surface;

a roller;

an awning having a leading edge fastened to the roller so as to be rollable around the roller and a trailing edge fastened to the header rail, said awning being adapted to rest on the base wall in a retracted position;

a pair of support poles removably disposable between the roller and a ground surface so as to support the awning; and a pair of rafters removably disposable between the back wall of the header rail and the roller so as to maintain the awning in an extended position, each rafter having a pin insertable through an aperture of one of the support poles to engage a hole in the roller.

22. A method of installing a portable awning assembly on a mounting surface, said awning assembly including an awning fastened to and rolled on a roller, said method comprising the steps of:

slidingly locating a plurality of suction cups within at least one slide channel of a header rail;

placing the header rail near the surface and pressing the header rail toward the mounting surface so as to engage the suction cups with the mounting surface and mount the header rail thereon;

unrolling the awning from the roller;

installing a pair of rafters between the header rail and a leading edge of the awning so as to maintain the awning in an extended position; and installing a pair of support poles between the leading edge and a ground surface so as to support the awning above the ground surface.

\* \* \* \* \*